United States Patent Office 2,772,306
Patented Nov. 27, 1956

2,772,306

PROCESS FOR THE PREPARATION OF CHLORO-NITRO-CARBAMIC ACID ESTER

George R. Thomas, Brookline, Mass.

No Drawing. Application May 10, 1954,
Serial No. 428,798

8 Claims. (Cl. 260—482)

This invention relates to the preparation of derivatives of nitrocarbamic esters.

Nitrocarbamic acid esters

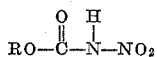

are not well known and have heretofore been produced only by complicated expensive processes and have therefore not found extensive use commercially.

It is an object of this invention to produce derivatives of nitrocarbamic esters from materials that are readily available to the industry by a process that is economical and returns high yields.

It is a further object of this invention to avoid the use of low temperatures and excessive pressures.

It is a still further object of this invention to produce by this novel process new products, hereinafter described.

Nitrocarbamic acid esters

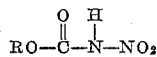

wherein

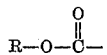

is an ester group wherein R is alkyl, aralkyl or cycloalkyl, have been produced in the past. The hydrogen attached to the nitrogen group is acidic in nature. (Thiele and Lachmann, Ann. 288, 287 (1895); Lachmann and Thiele, Ber. 27, 1520 (1894)). These compounds may be easily converted to

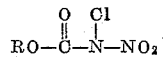

by reacting the nitrocarbamic acid ester with a chlorinating agent. Such chlorinating agents as chlorine, an organic or inorganic hypochlorite, may be reacted according to:

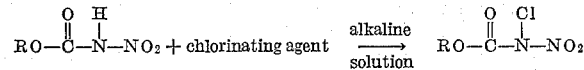

It has also been found that the N-chloro-N-nitro-carbamic acid ester produced in this manner can be reacted with olefins which are hydrocarbon having a double bond >C=C< wherein the double bond is broken and chlorine adds to one carbon and

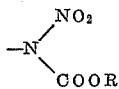

adds to the other carbon. Thus:

(1)
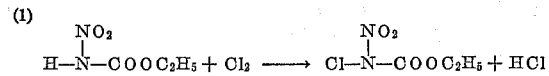

(2)
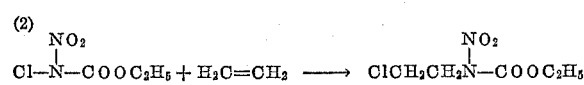

The chlorinating agent as pointed out above may be any of the normal chlorinating agents; t-butylhypochlorite is a convenient material to use and yields t-butyl alcohol along with the chlorinated product. This may be separated from the nitrochlorocarbamic acid ester or the reaction mixture may be used without separation which is the preferred form of the process. If chlorine is used the pH must be adjusted so that it is alkaline in the neighborhood of pH 8. An inorganic chlorinating agent such as sodium hypochlorite may be used as well as the organic chlorinating agent referred to above.

The ethyl N-chloro-N-nitro carbamate is not stable over 35° C. and care must be taken to prevent this material from decomposing. This will be more clearly understood from the following examples.

EXAMPLE NO. 1

*The preparation of ethyl N-2-chloroethyl-N-nitro-carbamate*

Ethyl nitrocarbamate, 0.1 mole, and t-butyl hypochlorite, 0.12 mole, are mixed in a reaction flask suitable for pressure work until complete dissolution of the ethyl nitrocarbamate occurs. (The dissolving of the nitrocarbamate, a solid, melting at 64–65° C., is an endothermic process which compensates for the heat of reaction. Caution should be used dealing with the liquid nitrocarbamates.) The flask is then closed and cooled in a salt-ice bath. Ethylene is then introduced to pressure of ten pounds. After enough ethylene is absorbed so that the pressure drops to five pounds per square inch more ethylene is added until a pressure of ten pounds per square inch is established. This process is repeated, the pressure being gradually increased with each addition, until no more absorption of ethylene occurs. The temperature of the reaction is kept below that at which decomposition occurs. It has been found satisfactory to operate at temperatures between 0° C. and 25° C.. and up to final pressures of thirty pounds but these temperatures and pressures should not be considered as limiting factors. No advantage accrues at higher pressures.

The product is worked up by distillation. The t-butyl alcohol and excess t-butyl hypochlorite can be removed by distillation at a vacuum pressure of 20 mm. and a maximum pot temperature of 100° C.

The residue in the pot, principally the desired product, may be distilled at column temperatures of 85–90° C. at 0.1 mm. Hg. It is identical with that reported by Curry and Mason (Journal of the American Chemical Society 73, 5043 (1951).

If the reaction has not been allowed to proceed to completion, an alternate method is used because the alkyl nitrocarbamate decomposes and interferes with the distillation. The reaction mixture diluted with ether is washed with sodium bicarbonate until the pH of the aqueous layer is 8. The ethereal solution is dried over calcium chloride and the distillation is carried out as above.

EXAMPLE NO. 2

*The preparation of N-butyl N-chloroisopropyl-N-nitro-carbamate*

The procedure for the preparation of this compound is identical with that described in Example No. 1, with the exception that propylene and butyl nitrocarbamate are used. This reaction is much more rapid than that with ethylene, and attention must be paid to the temperature to prevent the reaction from getting out of control. The product is the residue which remains in the pot at 100° C. under a pressure of 0.1 mm. Above this temperature it decomposes.

EXAMPLE NO. 3

*The preparation of n-hexyl-N-β-chloroethyl-N-nitrocarbamate*

The procedure for the preparation of this compound is identical with that described in Example No. 2 except that n-hexyl nitrocarbamate and ethylene are used.

EXAMPLE NO. 4

*The preparation of ethyl N-chloroisopropyl-N-nitrocarbamate*

The procedure for the preparation of this compound is identical with that described in Example No. 1, except that propylene is used instead of ethylene. Again the reaction is much more rapid and attention must be paid to the control of temperature. The product distilled at 95° C. at 0.2 mm. mercury pressure.

EXAMPLE NO. 5

*The preparation of ethyl N-2-chlorocyclohexyl-N-nitrocarbamate*

A mixture of 0.24 mole of t-butyl hypochlorite and 0.20 mole of ethyl nitrocarbamate is stirred until complete solution occurs. During this time the temperature goes down to 10° C., then rises slowly to 30° C. and begins to evolve a gas. The mixture is then cooled to 5° C. in an ice-salt bath and stirred vigorously. The cyclohexene is added down the wall of the flask at such a rate that the temperature is maintained between 5–15° C. (Cyclohexene added dropwise to the surface of the liquid results in a sputtering and localized heating of the reaction.) After about 0.2 mole of cyclohexene has been added no further evidence of reaction is obtained. The mixture diluted with ether is washed with saturated sodium bicarbonate until the aqueous layer has a pH of 8. The organic layer is dried over calcium chloride. The ether, excess t-butyl alcohol, and by-products are removed by distillation, first at 20 mm. and a maximum pot temperature of 90° C., then at 0.1 mm. Hg and a maximum pot temperature of 100° C. Above this temperature the residue in the pot, which consists principally of the product, decomposes.

EXAMPLE NO. 6

*Preparation of ethyl chloronitrocarbamate*

This preparation can be applied to any of the alkyl nitrocarbamates. To the alkyl nitrocarbamate suspended in water is added solid sodium bicarbonate until the pH=8. The solution is cooled to 10° C. and is saturated with chlorine. The oil, which forms a layer on the bottom of the flask, is separated from the solution and dried over anhydrous calcium chloride. The excess chlorine is removed under diminished pressure. The oil contains ethyl chloronitrocarbamate along with some ethyl nitrocarbamate. It can be used as such in lieu of the t-butyl hypochlorite-alkyl nitrocarbamate mixture in Examples 1 to 5.

EXAMPLE NO. 7

*Preparation of ethyl N-chloro-N-nitrocarbamate with inorganic hypochlorite solution and addition of ethyl N-chloro-N-nitrocarbamate to ethylene*

To 13.4 g. (0.1 mole) of ethyl N-nitrocarbamate suspended in 100 ml. of 25% sulfuric acid is added in a fine stream 300 ml. of aqueous solution of sodium hypochlorite (5.25% by weight). The solution is stirred vigorously throughout and the temperature is maintained at 10° C. by means of an external cooling bath. After the addition the mixture is allowed to settle, the aqueous layer is decanted from the ethyl N-chloro-N-nitrocarbamate which separates as an oil. The oil is taken up in 20 ml. of carbon tetrachloride, dried over magnesium sulfate, and then filtered free of magnesium sulfate. The solution is then reacted with ethylene in a closed vessel.

The pressure of the ethylene initially impressed on the solution was 10 lbs. After the ethylene has been absorbed so that the pressure drops to five pounds per square inch the pressure is then raised to twenty pounds per square inch. After the pressure has dropped five pounds per square inch the pressure is then raised to thirty pounds per square inch and so on until the pressure is sixty pounds per square inch, and no further drop in pressure occurs. The reaction mixture was vigorously stirred throughout and the temperature is maintained between 8–12° C.

The reaction mixture is washed with 20% potassium carbonate until the aqueous layer is basic, dried over anhydrous magnesium sulfate, and then filtered free of the drying agent.

The solvent was removed by distillation under reduced pressure (10 mm. Hg) and a maximum pot temperature of 80° C. The residue, principally the desired product, is distilled at a column temperature of 85–90° C. at 0.1 mm. Hg. This fraction is indentical with the product described in Example 1.

The advantages of this improvement are many; a rapid easy method of producing substituted nitrocarbamic acid esters in an economical manner is available for the first time. These materials are made by a two-step process, where the chloro-compound is an intermediate product of the reaction. This compound may be separated but it is not necessary to do so in order to conduct the second step of the reaction. No expensive or unusual reactants are required and the product is obtained in high yield and may be easily purified so that it may be used directly as either an additive for diesel motor fuels or as an organic solvent.

What is claimed is:

1. A process for the preparation of a compound of the type

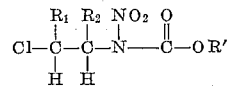

wherein $R_1$, $R_2$ are substituent radicals selected from the group consisting of hydrogen, alkyl, aralkyl, and cycloalkyl; and $R'$ is a radical selected from the group consisting of alkyl, aralkyl, and cycloalkyl; by the addition of

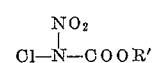

to an olefin of the formula

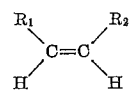

at a temperature below the decomposition temperature of the N-chloro-N-nitrocarbamate.

2. A process as claimed in claim 1, wherein the olefin is ethylene.

3. A process for the preparation of a compound of the type

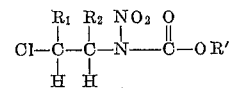

wherein $R_1$, $R_2$ are substituent radicals selected from the group consisting of hydrogen, alkyl, aralkyl, and cycloalkyl; and $R'$ is a radical selected from the group consisting of alkyl, aralkyl, and cycloalkyl; by the addition to an olefin of the formula

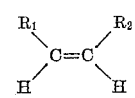

of

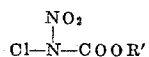

which is prepared by chlorination of the compound

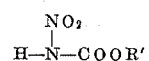

at a temperature below the decomposition temperature of the N-chloro-N-nitrocarbamate.

4. A process for the preparation of compounds of the class

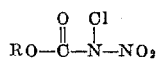

wherein

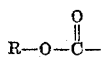

is an ester group and R is a radical selected from the group consisting of alkyl, aralkyl and cycloalkyl; which comprises reacting

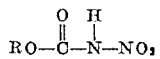

with a chlorinating agent.

5. A process for the preparation of compounds of the class

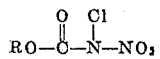

wherein

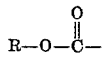

is an ester group and R is a radical selected from the group consisting of alkyl, aralkyy and cycloalkyl; which comprises reacting the sodium salt of

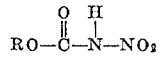

with chlorine at an initial pH of 8.

6. A process for the preparation of compounds of the

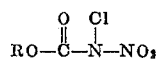

wherein

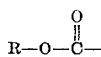

is an ester group and R is a radical selected from the group consisting of alkyl, aralkyl, and cycloalkyl; which comprises reacting

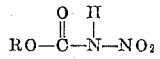

with an inorganic hypochlorite in an acid medium.

7. A process for the preparation of compounds of the class

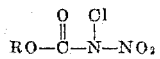

wherein

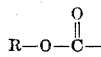

is an ester group and R is a radical selected from the group consisting of alkyl, aralkyl and cycloalkyl; which comprises reacting

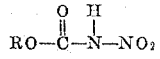

with an organic hypochlorite,

8. As a new compound N-chloro-N-nitro-carbamic acid ester of the formula

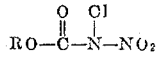

wherein

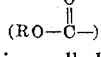

is an ester group and R is an alkyl group.

References Cited in the file of this patent

FOREIGN PATENTS 573,752     Great Britain _____ Dec. 5, 1945

OTHER REFERENCES

Curry et al.: J. Am. Chem. Soc. 73 (1951) 5043–6.
Wagner et al.: "Synthetic Organic Chemistry" (1953), pages 103 and 672.